United States Patent
Pichler et al.

(10) Patent No.: US 12,092,057 B2
(45) Date of Patent: Sep. 17, 2024

(54) METHOD AND DEVICE FOR DIAGNOSING A VENTILATION LINE OF AN INTERNAL COMBUSTION ENGINE FUEL TANK

(71) Applicant: Vitesco Technologies GmbH, Regensburg (DE)

(72) Inventors: Thomas Pichler, Hohenau (DE); Thomas Koenig, Mintraching (DE)

(73) Assignee: Vitesco Technologies GmbH, Regensburg (DE)

( * ) Notice: Subject to any disclaimer, the term of this patent is extended or adjusted under 35 U.S.C. 154(b) by 270 days.

(21) Appl. No.: 17/655,106

(22) Filed: Mar. 16, 2022

(65) Prior Publication Data

US 2022/0205414 A1    Jun. 30, 2022

Related U.S. Application Data

(63) Continuation of application No. PCT/EP2020/074342, filed on Sep. 1, 2020.

(30) Foreign Application Priority Data

Sep. 18, 2019  (DE) .................. 10 2019 214 241.9

(51) Int. Cl.
    *F02M 25/08*    (2006.01)
(52) U.S. Cl.
    CPC .............................. *F02M 25/0818* (2013.01)
(58) Field of Classification Search
    CPC .......... F02M 25/0818; F02M 25/0827; F02M 25/0809; B60K 2015/03585; B60K 15/03504; F02D 2200/0406; F02D 41/003; F02D 41/042; F02D 41/062; F02D 41/08; F02D 41/22

USPC ................... 123/516, 518, 519, 520, 198 D; 701/103–105, 107, 112, 113; 73/114.39
    See application file for complete search history.

(56) References Cited

U.S. PATENT DOCUMENTS

| | | |
|---|---|---|
| 6,089,081 A | 7/2000 | Cook et al. |
| 2001/0029933 A1 | 10/2001 | Fabre et al. |
| 2001/0032625 A1 | 10/2001 | Fabre |
| 2001/0042399 A1 | 11/2001 | Dawson et al. |
| 2009/0090171 A1 | 9/2009 | Grunwald et al. |
| 2015/0142293 A1 | 5/2015 | Dudar et al. |
| 2018/0045127 A1 | 2/2018 | Miura |
| 2018/0223762 A1 | 8/2018 | Insixiengmai |

FOREIGN PATENT DOCUMENTS

| | | |
|---|---|---|
| DE | 60115850 T2 | 7/2006 |
| DE | 102005054880 B3 | 6/2007 |

OTHER PUBLICATIONS

International Search Report and Written Opinion dated Oct. 13, 2003 from corresponding International Patent Application No. PCT/EP2020/074342.
German Office Action dated Aug. 8, 2020 for corresponding German Patent Application No. 10 2019 214 241.9.
Chinese Office Action dated Nov. 28, 2023 for corresponding Patent Application No. 202080065653.1.

*Primary Examiner* — Hai H Huynh

(57) ABSTRACT

A method and a device for diagnosing a ventilation line of a motor vehicle are provided. The ventilation line is arranged between a fuel tank and an activated carbon filter. The motor vehicle has a control unit (ECU) and is powered by an internal combustion engine. The state of a vacuum switch is evaluated for the diagnosis.

14 Claims, 5 Drawing Sheets

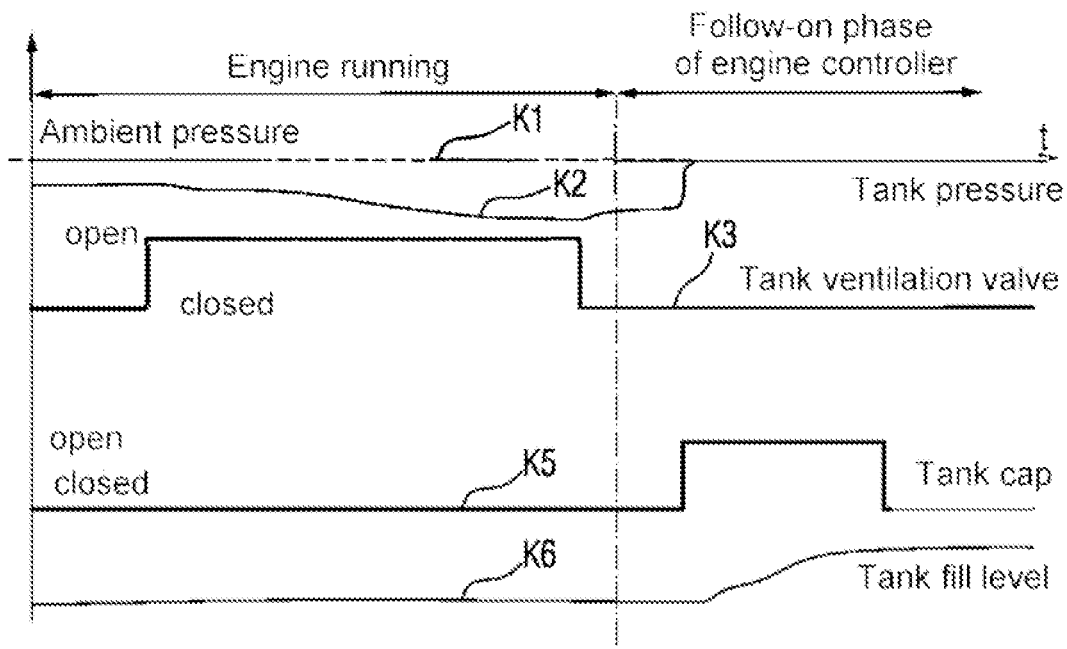
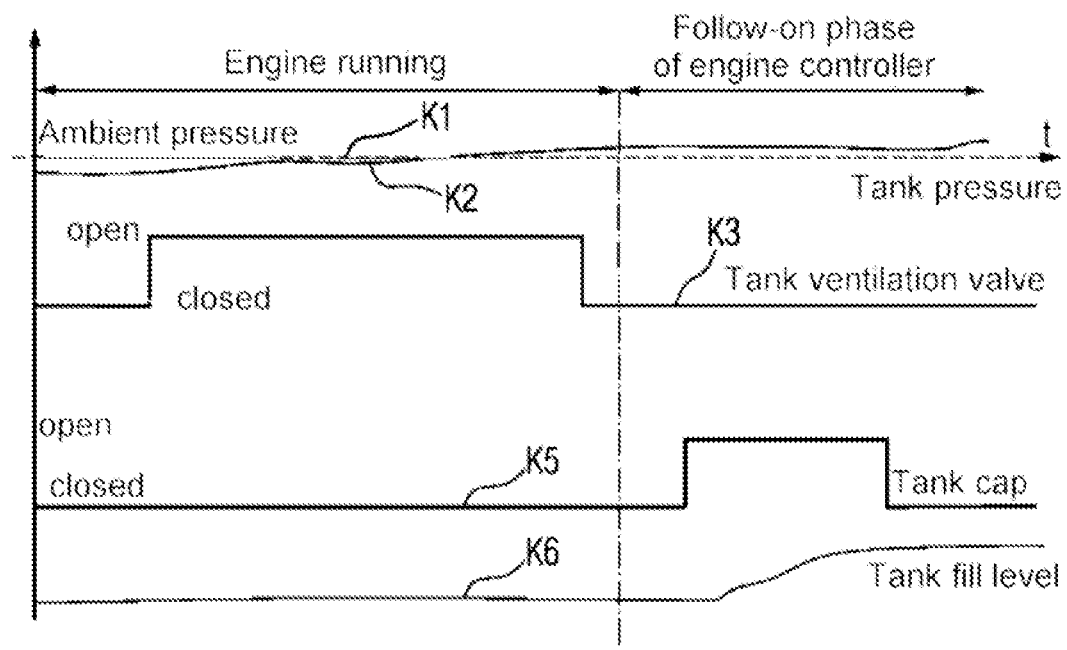

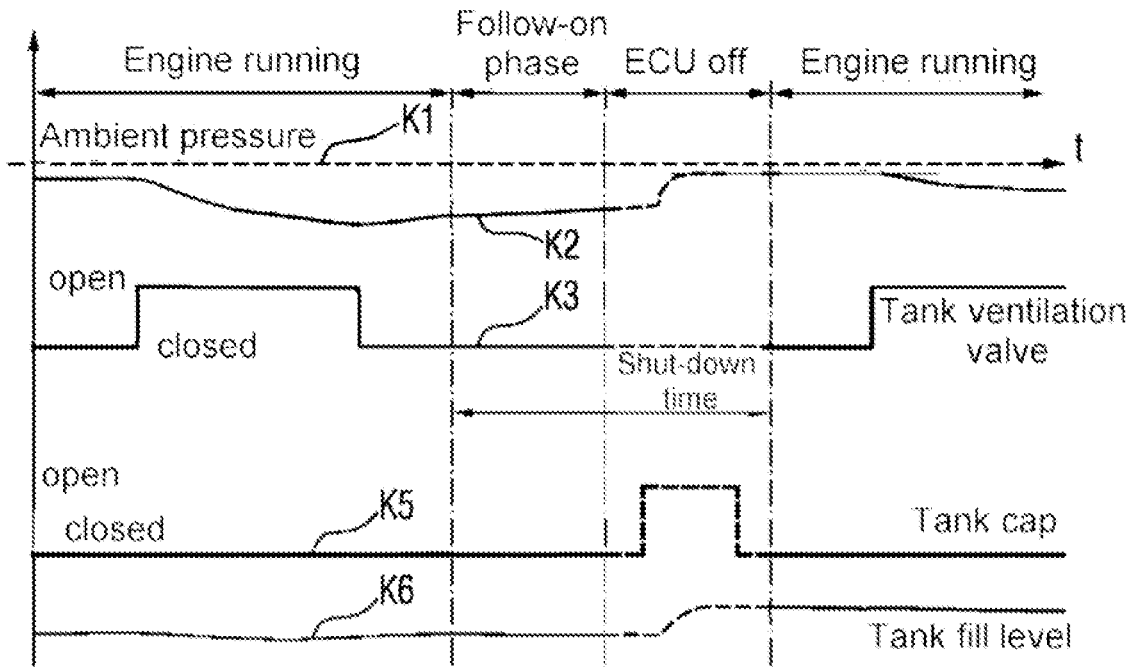
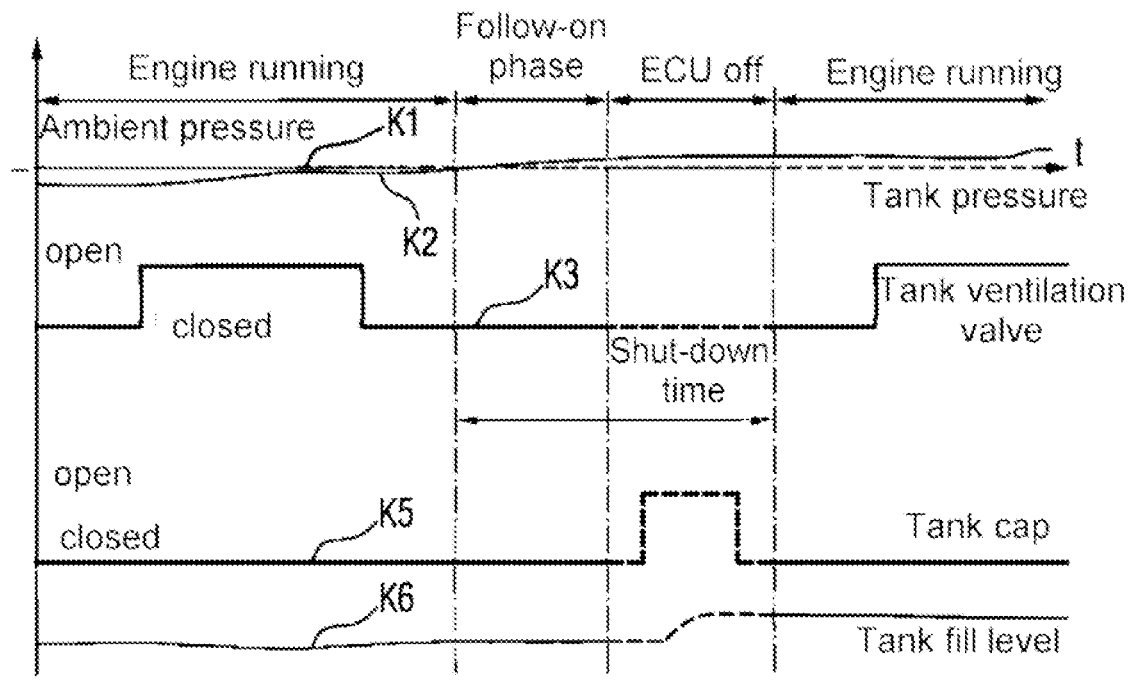

METHOD AND DEVICE FOR DIAGNOSING A VENTILATION LINE OF AN INTERNAL COMBUSTION ENGINE FUEL TANK

CROSS-REFERENCE TO RELATED APPLICATIONS

This application claims the benefit of PCT Application PCT/EP2020/074342, filed Sep. 1, 2020, which claims priority to German Application 10 2019 214 241.9, filed Sep. 18, 2019. The disclosures of the above applications are incorporated herein by reference.

TECHNICAL FIELD

The disclosure relates to a method and a device for diagnosing the ventilation line of the fuel tank of a motor vehicle that can be powered by an internal combustion engine.

BACKGROUND

A known tank system of a motor vehicle that can be powered by an internal combustion engine is illustrated in FIG. 1. This tank system has a fuel tank 1. A ventilation line 2 is provided between the fuel tank 1 and an activated carbon filter 3. Hydrocarbons outgassed from the fuel tank are bound in the activated carbon filter 3. The hydrocarbon gases are introduced from the activated carbon filter 3 into the air path of an internal combustion engine via the tank ventilation line 2. A tank ventilation valve 5, which is designed as a switching or linear valve, is activated by an engine controller ECU in order to regulate the gas flow from the activated carbon filter 3 to the air path of the internal combustion engine. A tank cap 6 is provided for the airtight closure of the fuel tank 1. A tank pressure sensor 7 is situated in the fuel tank 1. Furthermore, a fill level sensor 8 is provided in the fuel tank 1, which fill level sensor is used to determine the present fuel fill level.

An engine controller ECU is configured to determine a setpoint value for the scavenging flow from the activated carbon filter 3 to the internal combustion engine for the respectively present operating state. Furthermore, the engine controller ECU is configured to receive pressure sensor signals from the tank pressure sensor 7 and to use these output signals to determine an intake pipe pressure in the intake tract. Furthermore, the engine controller ECU is configured to determine a PWM value for the activation of the tank ventilation valve 5 from the pressure gradient between the fresh-air connection of the activated carbon filter 3 and the pressure at the inlet point in the air path of the internal combustion engine and the specified scavenging flow. Furthermore, the engine controller ECU is configured to calculate a fuel quantity to be injected for the respectively present operating state of the internal combustion engine.

To meet country-specific legislative regulations, it is necessary to ensure or diagnose the functionality of the fuel tank ventilation system of a motor vehicle that can be powered by an internal combustion engine. This diagnosis includes a check of the functionality or patency of the ventilation line 2 provided between the fuel tank 1 and the activated carbon filter 3. If this ventilation line is blocked, an absorption of hydrocarbon vapors that arise in the fuel tank cannot be ensured in the activated carbon filter. Furthermore, due to this blockage, refuelling of the motor vehicle is possible only to a very limited extent due to positive pressures that arise in the fuel tank, which consequently leads inter alia to increased hydrocarbon emissions.

It is already known to perform a diagnosis of the ventilation line of the fuel tank of a motor vehicle which can be powered by an internal combustion engine with the aid of the tank pressure sensor 7 installed in the fuel tank 1. In certain operating states of the internal combustion engine, the tank ventilation valve 5 is activated to affect an evacuation of the fuel tank 1 by way of the resulting mass flow. Consequently, a pressure drop in the fuel tank that arises during the activation of the tank ventilation valve is evaluated to check the quality of the ventilation line 2. If the tank pressure does not fall during the diagnosis, the presence of a defective or blocked ventilation line 2 is detected.

SUMMARY

One aspect of the disclosure provides a method for diagnosing a ventilation line arranged between a fuel tank and an activated carbon filter of a motor vehicle. The motor vehicle has a control unit and is powered by an internal combustion engine. The state of a vacuum switch is evaluated for the diagnosis. The method requires no pressure sensor installed in the fuel tank.

Implementations of the disclosure may include one or more of the following optional features. In some implementations, the state of a vacuum switch arranged on the fresh-air side of the activated carbon filter is evaluated for the diagnosis.

In some examples, the state of the vacuum switch and changes in the fill level of the fuel tank are evaluated as part of the diagnosis.

The vacuum switch may be brought into its closed state before the state of the vacuum switch is evaluated and before the changes in the fill level of the fuel tank are evaluated.

In some implementations, the diagnosis is performed during internal combustion engine operation while the motor vehicle is at idle, and if changes in the fill level are identified and the vacuum switch switches into its open position, the presence of a functional ventilation line is detected, and if changes in the fill level are identified and the vacuum switch remains in its closed position, the presence of a defective ventilation line is detected.

In some implementations, the diagnosis is performed during follow-on operation of a control unit when the internal combustion engine has been shut down, and if changes in the fill level are identified and the vacuum switch switches into its open position, the presence of a functional ventilation line is detected, and if changes in the fill level are identified and the vacuum switch remains in its closed position, the presence of a defective ventilation line is detected.

In some examples, the diagnosis is performed after a refuelling of the motor vehicle when the engine control unit has been shut down. After a restart of the engine control unit, the fill level of the fuel tank measured at the time of the previous shutdown of the engine control unit is compared with a presently measured fill level of the fuel tank, and the position of the vacuum switch at the time of the previous shutdown of the engine control unit is compared with the present position of the vacuum switch, and if the vacuum switch has switched from its closed position into its open position and a change in the fill level of the fuel tank is identified, the presence of a functional ventilation line is detected, and if the vacuum switch has remained in its closed position and a change in the fill level of the fuel tank is identified, the presence of a defective ventilation line is detected.

In some implementations, the duration between the previous shutdown of the engine control unit and the restart of the engine control unit is measured and the diagnosis is performed only if the measured duration does not exceed a specified duration.

Another aspect of the disclosure provides a device for diagnosing a ventilation line, which is arranged between a fuel tank and an activated carbon filter, of a motor vehicle which has an engine control unit and which can be powered by an internal combustion engine. The device has an engine control unit that is configured to control the method described above.

The advantages of the disclosure are that the method enables a diagnosis of the tank ventilation line of a motor vehicle operated by an internal combustion engine without the need for a pressure sensor arranged in the fuel tank. Furthermore, the diagnostic method is insensitive to strongly degassing fuel and the associated increase in the pressure in the fuel tank. Furthermore, no active intervention in the tank ventilation control takes place during the operation of the internal combustion engine, which leads to an increase in the total mass throughput and consequently to improved scavenging of the activated carbon filter. Since, in some examples, the diagnostic method is performed during the refueling process and immediately after the engine control unit has been started up, that is to say when the vehicle is at a standstill, there is no influence of pressure fluctuations in the fuel tank, such as could occur due to high vehicle lateral or longitudinal dynamics. Finally, the diagnostic method is independent of the present fuel fill level, which, depending on the installation position of the tank pressure sensor, has an influence on the quality or validity of the presently measured tank pressure.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 shows exemplary signal profiles that illustrate the diagnostic process during follow-on operation of a control unit in the case of an intact tank ventilation line.

FIG. 6 shows exemplary signal profiles that illustrate the diagnostic process during follow-on operation of a control unit in the case of a blocked tank ventilation line.

FIG. 7 shows exemplary signal profiles that illustrate the diagnostic process after a restart of the control unit in the case of an intact tank ventilation line.

FIG. 8 shows exemplary signal profiles that illustrate the diagnostic process after a restart of the control unit in the case of a blocked tank ventilation line.

Like reference symbols in the various drawings indicate like elements.

DETAILED DESCRIPTION

Figure 1:
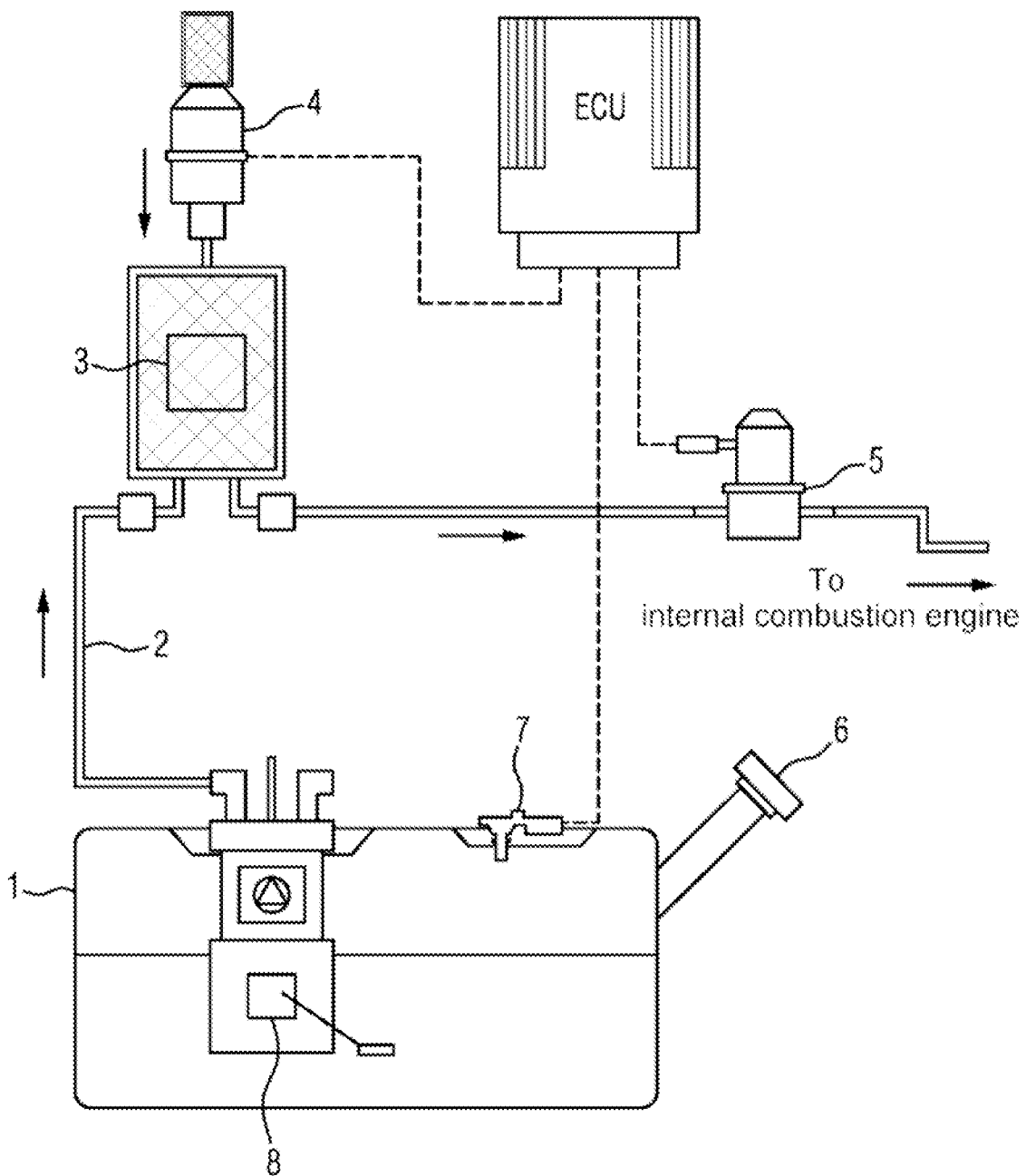
FIG. 1 shows a diagram of a tank system according to the prior art.
Figure 2:
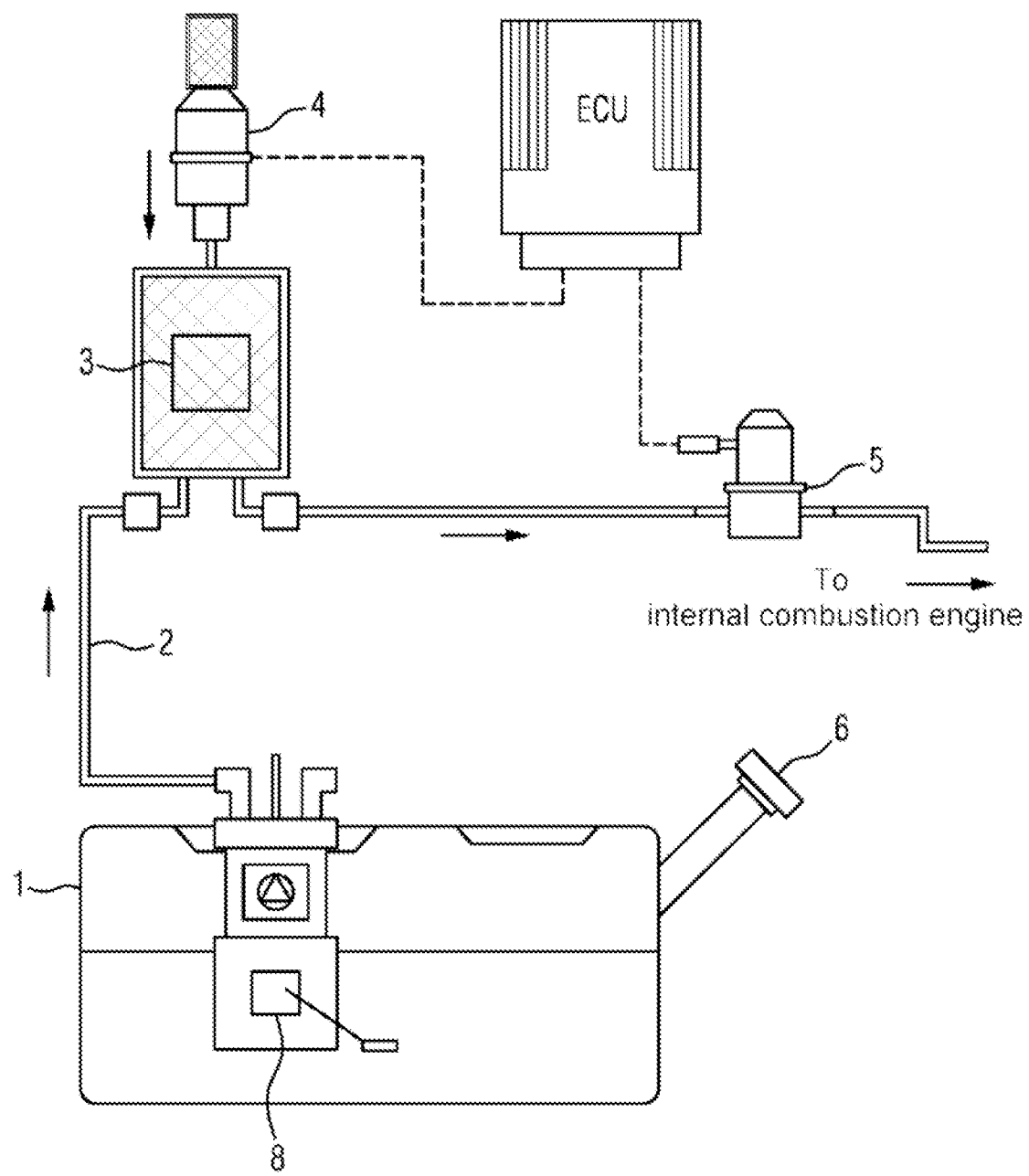
FIG. 2 shows a diagram of an exemplary tank system.

FIG. 2 shows an exemplary diagram of a tank system. The tank system has a fuel tank 1, a tank ventilation line 2, an activated carbon filter 3, a vacuum switch 4, a tank ventilation valve 5, a tank cap 6, a fill level sensor 8 and an engine control unit ECU.

The method described below for diagnosing the tank ventilation line 2 does not require a pressure sensor arranged in the fuel tank. The method is based on an evaluation of the state of the vacuum switch 4 on the fresh-air side of the activated carbon filter 3 in conjunction with an evaluation of changes in the fill level in the fuel tank that occur when the motor vehicle is refueled.

During the operation of the internal combustion engine, the tank ventilation valve 5 is activated for the purposes of scavenging the activated carbon filter 3. As a result, the vacuum switch 4 is closed due to the resulting mass flow. This vacuum switch 4 remains closed until a pressure equalization takes place in the entire volume from the fuel tank 1 to the tank ventilation valve 5.

This pressure equalization may on the one hand take place very slowly due to the non-airtight connection between the activated carbon filter 3 and the ambient air, or may on the other hand take place abruptly by way of an opening of the tank cap 6.

Since the tank cap 6 is opened each time the motor vehicle is refueled, an evaluation of the position of the vacuum switch 4 in conjunction with an evaluation of the change in the fill level caused by the refueling process allows a conclusion to be drawn regarding a blocked tank ventilation line between the fuel tank 1 and the activated carbon filter 3. A prerequisite for this is that the vacuum switch 4 is closed before the refueling process. Since the refueling process can take place while the engine is running but also in the follow-on phase of the engine controller, in which the ignition of the motor vehicle is switched off, the following states can be considered during the diagnostic process: the position of the vacuum switch 4 is monitored during the operation of the internal combustion engine; additional monitoring of changes in the fill level in the fuel tank 1 is performed while the vehicle is at a standstill and at idle; if the vacuum switch 4 switches from its closed position to its open position while a refueling process is taking place, the presence of an intact or functional tank ventilation line 2 between the fuel tank 1 and the activated carbon filter 3 is inferred; if, on the other hand, the vacuum switch 4 remains in its closed position while a refueling process or a change in the fill level is identified, a blocked tank ventilation line 2 between the fuel tank 1 and the activated carbon filter 3 is inferred.

Figure 3:
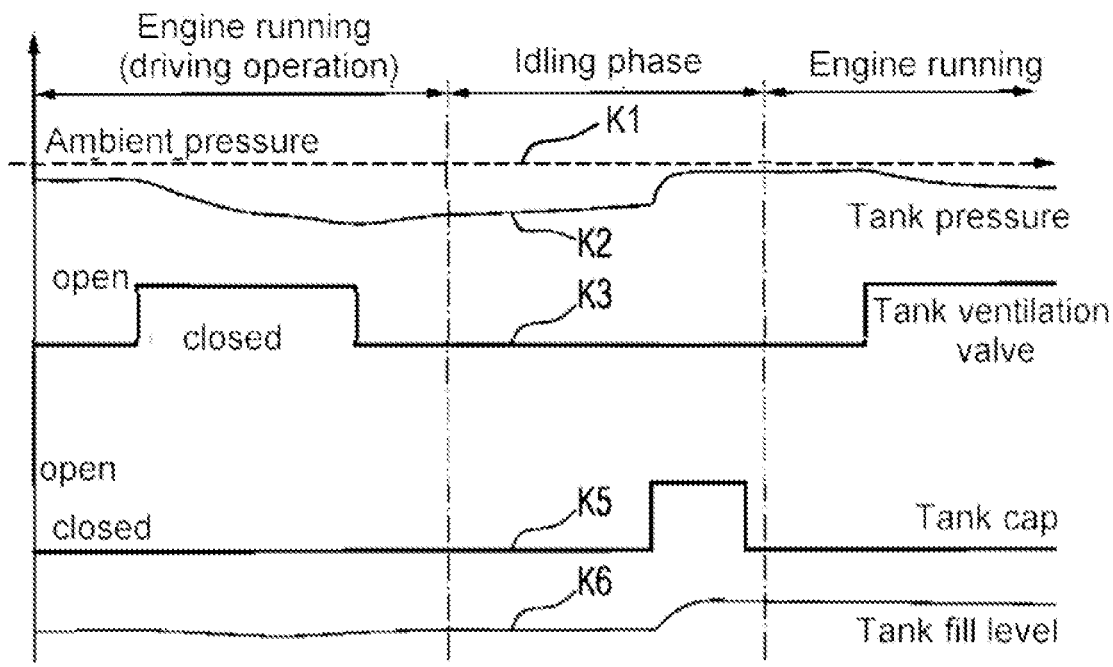
FIG. 3 shows exemplary signal profiles in the tank system shown in FIG. 2 in the case of an intact tank ventilation line.

FIG. 3 shows exemplary signal profiles in the tank system shown in FIG. 2 in the case of an intact tank ventilation line. Here, the profile K1 illustrates the ambient pressure, the profile K2 illustrates the pressure in the fuel tank, the profile K3 illustrates the state of the tank ventilation valve 5, the profile K4 illustrates the state of the vacuum switch 4, the profile K5 illustrates the state of the tank cap, and the profile K6 illustrates the tank fill level. From this FIG. 3, it can be seen that, during a refueling process in which a change in the fill level is detected, the vacuum switch 4 is brought from its closed state to its open state. It can be identified from this that the tank ventilation line arranged between the fuel tank 1 and the activated carbon filter 3 is in a functional, that is to say intact, state.

Figure 4:
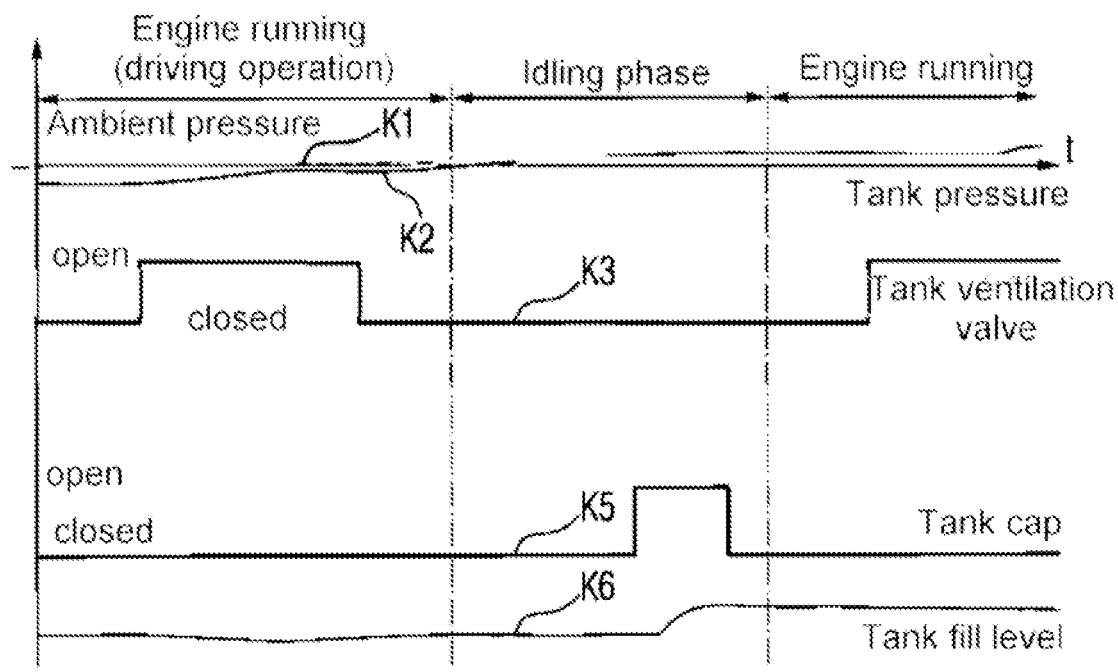
FIG. 4 shows exemplary signal profiles in the tank system shown in FIG. 2 in the case of a blocked tank ventilation line.

FIG. 4 shows exemplary signal profiles in the tank system shown in FIG. 2 in the case of a blocked tank ventilation line. Here, the profile K1 illustrates the ambient pressure, the profile K2 illustrates the pressure in the fuel tank, the profile K3 illustrates the state of the tank ventilation valve 5, the profile K4 illustrates the state of the vacuum switch 4, the profile K5 illustrates the state of the tank cap, and the profile K6 illustrates the tank fill level. From qa1 FIG. 4, it can be seen that, during a refueling process in which a change in the fill level is detected, the vacuum switch 4 remains in its closed state. It can be identified from this that the tank ventilation line arranged between the fuel tank 1 and the activated carbon filter 3 is in a defective, that is to say blocked, state.

Below, a description will be given of the diagnostic process during follow-on operation of a control unit, in which the internal combustion engine is in the off state and the control unit is in the on state. Here, the following states can be considered: the position of the vacuum switch 4 is monitored during the operation of the internal combustion engine; additional monitoring of changes in the fill level in the fuel tank 1 is performed while the vehicle is at a standstill, when the internal combustion engine is in its off state and the engine control unit is in its on state; if the vacuum switch 4 switches from its closed state to its open state, the presence of an intact or functional tank ventilation line 2 between the fuel tank 1 and the activated carbon filter 3 is inferred; if, on the other hand, the vacuum switch 4 remains in its closed position while a refueling process or a change in the fill level is identified, a blocked tank ventilation line 2 between the fuel tank 1 and the activated carbon filter 3 is inferred.

FIG. 5 shows exemplary signal profiles that illustrate the diagnostic process during follow-on operation of a control unit in the case of an intact tank ventilation line. Here, the profile K1 illustrates the ambient pressure, the profile K2 illustrates the pressure in the fuel tank, the profile K3 illustrates the state of the tank ventilation valve 5, the profile K4 illustrates the state of the vacuum switch 4, the profile K5 illustrates the state of the tank cap, and the profile K6 illustrates the tank fill level. From this FIG. 5, it can be seen that, during a refueling process in which a change in the fill level is detected, the vacuum switch 4 is brought from its closed state to its open state. It can be identified from this that the tank ventilation line arranged between the fuel tank 1 and the activated carbon filter 3 is in a functional, that is to say intact, state.

FIG. 6 shows exemplary signal profiles that illustrate the diagnostic process during follow-on operation of a control unit in the case of a blocked tank ventilation line. Here, the profile K1 illustrates the ambient pressure, the profile K2 illustrates the pressure in the fuel tank, the profile K3 illustrates the state of the tank ventilation valve 5, the profile K4 illustrates the state of the vacuum switch 4, the profile K5 illustrates the state of the tank cap, and the profile K6 illustrates the tank fill level. From this FIG. 6, it can be seen that, during a refueling process in which a change in the fill level is detected, the vacuum switch 4 remains in its closed state. It can be identified from this that the tank ventilation line arranged between the fuel tank 1 and the activated carbon filter 3 is in a defective, that is to say blocked, state.

Below, an explanation will be given of the diagnostic process after a restart of the engine control unit, with refuelling having been performed while the engine control unit was in the off state. Here, the following states can be considered: after the engine control unit has been switched on and while the internal combustion engine is switched off, the fuel fill level that was measured at the time at which the engine control unit was shut down is compared with the presently measured fuel fill level; after the engine control unit has been switched on and while the internal combustion engine is switched off, the position of the vacuum switch 4 at the time at which the engine control unit was shut down is compared with the present position. If the vacuum switch 4 has switched from its closed position to its open position while a refueling process with a change in fill level has been identified at the same time, then the presence of a functional, that is to say intact, tank ventilation line 2 between the fuel tank 1 and the activated carbon filter 3 is inferred.

The procedure described in the previous two steps for evaluating the switch position of the vacuum switch 4 and for evaluating the tank fill level is performed only if the shut-down time of the internal combustion engine does not exceed a settable value. The consideration of the shut-down time of the internal combustion engine is intended to ensure that the transitions of the vacuum switch 4, which are based on the above-described natural pressure equalization processes in the fuel system, do not erroneously lead to incorrect results.

If the vacuum switch 4 has remained in its closed position during a refueling process with a change in fill level, then a defective, that is to say blocked, tank ventilation line 2 between the fuel tank 1 and the activated carbon filter 3 can be inferred.

FIG. 7 shows signal profiles that illustrate the diagnostic process after a restart of the control unit in the case of an intact tank ventilation line. Here, the profile K1 illustrates the ambient pressure, the profile K2 illustrates the pressure in the fuel tank, the profile K3 illustrates the state of the tank ventilation valve 5, the profile K4 illustrates the state of the vacuum switch 4, the profile K5 illustrates the state of the tank cap, and the profile K6 illustrates the tank fill level. From this FIG. 7, it can be seen that, during a refueling process in which a change in the fill level is detected, the vacuum switch 4 is brought from its closed state to its open state. It can be identified from this that the tank ventilation line arranged between the fuel tank 1 and the activated carbon filter 3 is in a functional, that is to say intact, state.

FIG. 8 shows signal profiles that illustrate the diagnostic process after a restart of the control unit in the case of a blocked tank ventilation line. Here, the profile K1 illustrates the ambient pressure, the profile K2 illustrates the pressure in the fuel tank, the profile K3 illustrates the state of the tank ventilation valve 5, the profile K4 illustrates the state of the vacuum switch 4, the profile K5 illustrates the state of the tank cap, and the profile K6 illustrates the tank fill level. From this FIG. 8, it can be seen that, during a refueling process in which a change in the fill level is detected, the vacuum switch 4 remains in its closed state. It can be identified from this that the tank ventilation line arranged between the fuel tank 1 and the activated carbon filter 3 is in a defective, that is to say blocked, state.

A number of implementations have been described. Nevertheless, it will be understood that various modifications may be made without departing from the spirit and scope of the disclosure. Accordingly, other implementations are within the scope of the following claims.

What is claimed is:

1. A method for diagnosing a ventilation line of a motor vehicle, the ventilation line arranged between a fuel tank and an activated carbon filter, the motor vehicle including an engine control unit (ECU) and an internal combustion engine powering the motor vehicle, the method comprising:
evaluating a state of a vacuum switch arranged on a fresh-air side of the activated carbon filter;
evaluating changes in a fill level of the fuel tank;
detecting a presence of a functional ventilation line when a change in the fill level is identified and the vacuum switch moves to an open position, and
detecting a presence of a defective ventilation line when the change in the fill level is identified and the vacuum switch remains in a closed position, the presence of the defective ventilation line indicative of an increase in hydrocarbon emission of the motor vehicle.

2. The method of claim 1, further comprising:
before evaluating the state of the vacuum switch and before evaluating the changes in the fill level of the fuel tank, adjusting the vacuum switch to a closed.

3. The method of claim 2, wherein evaluating the state of the vacuum switch and evaluating the changes in the fill level of the fuel tank are performed during internal combustion engine operation while the motor vehicle is at idle.

4. The method of claim 2, wherein evaluating the state of the vacuum switch and evaluating the changes in the fill level of the fuel tank are performed during follow-on operation of a control unit when the internal combustion engine has been shut down.

5. The method of claim 2, wherein evaluating the state of the vacuum switch and evaluating the changes in the fill level of the fuel tank are performed after a refuelling of the motor vehicle when the engine control unit has been shut down.

6. The method of claim 5, further comprising:
after a restart of the engine control unit, comparing the fill level of the fuel tank measured at a time of a previous shutdown of the engine control unit with a presently measured fill level of the fuel tank;
comparing a position of the vacuum switch at the time of the previous shutdown of the engine control unit with a present position of the vacuum switch;
detecting a presence of a functional ventilation line when the vacuum switch has switched from the closed position into the open position and a change in the fill level of the fuel tank is identified; and
detecting a presence of a defective ventilation line when the vacuum switch has remained in the closed position and a change in the fill level of the fuel tank is identified.

7. The method of claim 6, further comprising:
measuring a duration between the previous shutdown of the engine control unit and the restart of the engine control unit;
evaluating the state of the vacuum switch and evaluating the changes in the fill level of the fuel tank only when the measured duration does not exceed a specified duration.

8. A device for diagnosing a ventilation line of a motor vehicle, the ventilation line arranged between a fuel tank and an activated carbon filter, the motor vehicle including an internal combustion engine powering the motor vehicle, the device comprising an engine control unit (ECU) controlling a method, the method comprising:
evaluating a state of a vacuum switch arranged on a fresh-air side of the activated carbon filter;
evaluating changes in a fill level of the fuel tank;
detecting a presence of a functional ventilation line when a change in the fill level is identified and the vacuum switch moves to an open position; and
detecting a presence of a defective ventilation line when the change in the fill level is identified and the vacuum switch remains in a closed position.

9. The device of claim 8, wherein the method further comprises:
before evaluating the state of the vacuum switch and before evaluating the changes in the fill level of the fuel tank, adjusting the vacuum switch to a closed.

10. The device of claim 9, wherein the method further comprises:
evaluating the state of the vacuum switch and evaluating the changes in the fill level of the fuel tank are performed during internal combustion engine operation while the motor vehicle is at idle.

11. The device of claim 9, wherein evaluating the state of the vacuum switch and evaluating the changes in the fill level of the fuel tank are performed during follow-on operation of a control unit when the internal combustion engine has been shut down;
detecting a presence of a functional ventilation line is detected when changes in the fill level are identified and the vacuum switch switches into its open position; and
detecting a presence of a defective ventilation line is detected when changes in the fill level are identified and the vacuum switch remains in its closed position.

12. The device of claim 9, wherein evaluating the state of the vacuum switch and evaluating the changes in the fill level of the fuel tank are performed after a refueling of the motor vehicle when the engine control unit has been shut down.

13. The device of claim 12, wherein the method further comprises:
after a restart of the engine control unit, comparing the fill level of the fuel tank measured at a time of a previous shutdown of the engine control unit with a presently measured fill level of the fuel tank, and
comparing a position of the vacuum switch at the time of the previous shutdown of the engine control unit with a present position of the vacuum switch;
detecting a presence of a functional ventilation line is detected when the vacuum switch has switched from its closed position into its open position and a change in the fill level of the fuel tank is identified,
detecting a presence of a defective ventilation line when the vacuum switch has remained in its closed position and a change in the fill level of the fuel tank is identified.

14. The device of claim 13, wherein the method further comprises:
measuring a duration between the previous shutdown of the engine control unit and the restart of the engine control unit;
evaluating the state of the vacuum switch and evaluating the changes in the fill level of the fuel tank only when the measured duration does not exceed a specified duration.

* * * * *